2,974,692

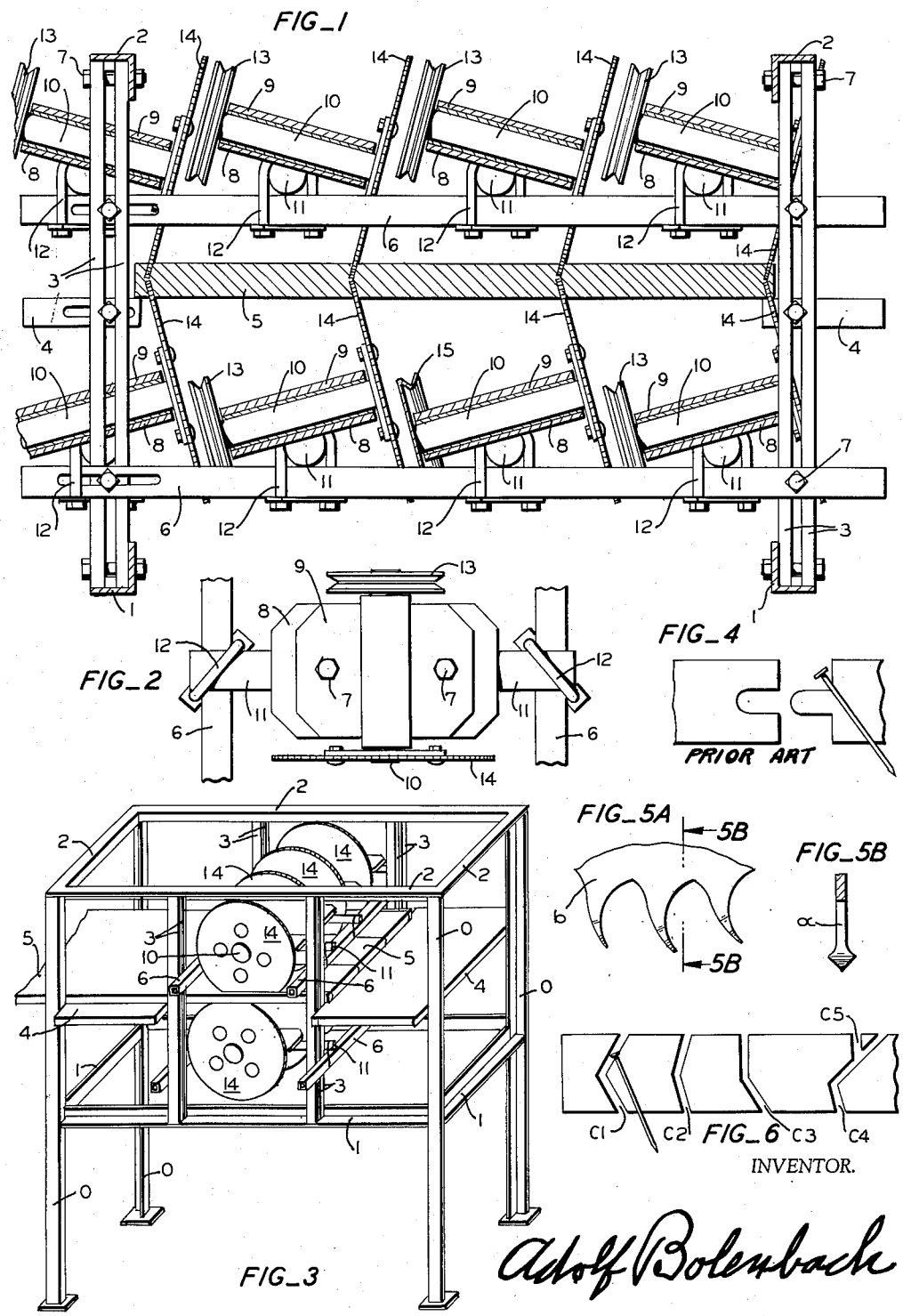

SAW AND METHOD FOR TONGUE AND GROOVE JOINTS

Adolf Bolenbach, 12630 Gail Ave., Sunnyvale, Calif.

Filed May 19, 1958, Ser. No. 736,396

3 Claims. (Cl. 143—38)

This invention relates to a new type of a gang saw or of a machine that saws several improved flooring boards or siding etc., each with an improved obtuse angle tongue and groove, in one operation, out of green or seasoned, finished wide boards, slabs, sheets etc.

The main object and advantage is to produce several of the popular 3 to 6 inch flooring boards (or siding, ceiling etc.) out of a finished wide board or plank with my saw and if board is seasoned, stained or varnished when sawed the flooring with improved tongue and groove is ready to lay and use.

At present 3 to 6 inch boards are sawed, then each is handled in stacking, taken to the planer and run thru, taken to sander, then to the shaper and grooved by circular whirling knives that cut one edge of a board into a long narrow tongue and the other edge into two long narrow lips with a narrow groove between, then each strip is handled to put into a stack to dry until sold, then loaded and unloaded on the job with the tongue and lips more or less distorted from drying. During all of this handling the narrow lips and tongues are split and broken and when the flooring is laid and the nails driven into the tongues they are often split and mashed and the upper edges of the boards are bruised by the hammer.

It takes several times as long to handle four narrow boards as a wide one and to groove four narrow boards separately. To cut a four foot sheet of plywood into three inch flooring it would have to be sawed now into sixteen three inch strips, each run thru the shaper, and each strip would be ⅜ to ½ inch narrower.

My saw saws them all in a minute with improved tongues and grooves and with no waste, all in one operation.

To saw a wide board into four flooring boards all complete, it would take five slanting saws cutting half ways into a board from above and five saws from below, thus cutting one edge of each board into an obtuse angle, beveled edge or tongue and the other edge would be an obtuse angle groove, the same shape, as seen in Fig. 1. This obtuse angle tongue and groove is far superior to the old pattern as fully explained in connection with the explanation of the drawing and the claims.

Since regular gangsaws are on a shaft they can only saw vertically into a board, but my series or gangs of saws had to be arranged on a two rail shelf instead of a shaft as complete separate saw units placed on the shelf to be slideable, tiltable, and moveable up or down, and the saw table, the board and upper and lower shelves also are tiltable for some advantages in sawing cut c3 Fig. 6.

Obtuse angle tongue and groove flooring boards can be laid much faster, because tongues and lips do not distort or warp while drying, even if sawed green and do not have to be hammered into each other since they have no split, broken, mashed tongues and lips from handling and nailing, no difficult nailing and therefore have no protruding nail heads interfering. The quick, complete, tight nailing into the obtuse angle tongue puts the obtuse angle tongue and groove together as one sheet tight on the sub floor with no play for groove side to buckle even under some moisture conditions. The two surfaces shrink evenly and have no distortions because of the tongue and groove being equal in size, shape, very blunt and large.

Another advantage is aside from sawing several flooring boards etc. from a wide board, slab or a sheet of material with my obtuse angle tongue and groove, that the saws can be set to run a precut single board thru or several at a time for obtuse angle tongues and grooves for flooring, siding, shiplap, ceiling etc. You can cut a sheet of plywood, wallboard etc. into 16" or 24" squares or panels quickly with tongues and grooves on four sides and if you want the adjoining edges with shallow surface grooves, that can be done at the same time.

All saw units will be run with belts or chain belts etc. from a motivated shaft to the rear. Modern accessories, feed rollers, guides, pressure rollers etc. will be added.

For siding, a special type groove at the adjoining edges, may be added in addition to the easy, strong, concealed nailing advantage. All over, ornamental, shallow grooves for interior squares, boards and panels can also be done.

The drawing:

Fig. 1 shows a vertical section through the saw units on their supports.

Fig. 2 is a top view of a saw unit on two bars.

Fig. 3 is a perspective view of the saws and frame.

Fig. 4 shows the prior art tongue-and-groove joint.

Figs. 5A and 5B show a shallow groove cutting saw.

Fig. 6 shows some of the obtuse angle saw cuts available.

Fig. 3 is a perspective view of the saw frame which consists of four upright corner angle irons O connected at the tops by four angle irons 2. About 18 inches from the floor are four horizontal angle irons or bars 1 connecting uprights O.

On the right side, about center, are seen two upright bars 3, also seen on the left. Each upright 3 consists of two parallel bars one half inch apart and bolted to parts 1 and 2, slidable thereon. Uprights 3 on right and left are connected above and below board 5 with horizontal bars 6 by bolts which slide between the two bars of the uprights for adjustment of both upper and lower bars 6, to the proper distance and level to board 5.

Fig. 1 shows front lower bar 6 attached to the front sides of front uprights 3 and upper bar 6 attached to their back sides, also shown in Fig. 3. Thus lower shelf bars 6 are set the thickness of upright 3 ahead of the upper shelf bar 6 and the lower saws will enter the board an inch ahead of the upper saws and prevent saw interference.

Fig. 1 shows a front view of a vertical cross cut of the saw units, saw blades 14, belt pulleys 13, and a special steel pulley 15, arbors 10, bearing support 8, bearing cover 9, board 5 and table support 4. Front views are shown of upper and lower front bars 6 (parts of upper and lower saw unit shelves), fastened to uprights 3, also tubular ends 11 of bearing support 8. Tubular ends of part 8 rest on shelf bars 6 fastened by U bolts 12 slidable as to distance apart and tiltable to saw obtuse angle tongue on one side and an obtuse groove on the other side of each narrow flooring board etc. sawed out of a wide board or sheet.

On the left end of bar 6 are shown slots, also on table support 4 whereby table, board 5 and the two bar shelves may be raised into a tilted position instead of horizontal position shown.

When sawing cuts c3 Fig. 4, it can be done by removing the upper shelf and saw units and using a shaft with saws the proper distance apart to cut the vertical half way cuts, probably best in ½ inch boards or sheets of plywood for flooring.

By tilting the board and shaft and lower shelf, the gang saws on the upper shafts will cut vertically into the board while the lower saws set perpendicular cut angling cuts into the boards from below, thus arbors, being horizontal, will not overheat quickly. This type of ½ inch boards placed on sub floors would save lots of wood and could be very popular. With the present type of tongue and groove the tongues and lips would be too thin, breakable and would warp too much on ½ inch flooring, hence not practical.

In case the arbors of the saw units should be longer to prevent overheating, every other saw on upper and lower shelf must be placed on another shelf behind the regular shelf to give more room for longer arbors, explained later.

In sawing 3 or 4 inch boards, conventional fastenings of pulleys and saws are replaced by welding a specially designed steel pulley 15 to the arbor, while the saw blade is bolted to a circular sheet of steel welded to the other end of the arbor, thus lengthening the arbors for less overheating.

Fig. 2 is a saw unit view from the right side and above. Part 8 supporting the saw unit is as wide as the narrowest floor boards to be sawed out of a wide board, and so is also the length of the arbors. The length of part 8 is to be determined by the width between the shelf bar 6 and their width by the size of the saw blades to be used.

The center of part 8 is a half inch circular depression suitable to the type of bearing to be held by it. Part 9 covers the bearing and the arbor therein and is bolted to part 8, whose ends are tubular bars slideable and tiltable and fastened on bar 6 by clamp 12.

The present tongue and groove with long narrow tongue and groove has above and below the groove the long thin lips. These, as well as the tongues, distort while drying and shrink badly, making the tongues thinner and the grooves bigger with lots of play, and from a lot of handling and from difficult nailing lots of split, broken and smashed tongues and lips.

As the tongues and lips continue to dry after the boards are laid the play of the tongue in the groove gets more and more and the groove side of the board not being nailed down tight will warp up and squeak and the upper lip side drying faster than its lower side will curl upward and necessitate planing of the floor. When the nail is driven into the thin tongue, it can not be driven all the way in and thus fails to drive the warped, smashed boards tightly together and to hold the boards tight to the subfloor, when dryer room atmosphere causes the upper part of a board to dry faster than the lower and edges to curl up.

The acute angle or V type angle tongue and groove has never been practical since it has the same difficulties as the regular tongue and groove in a greater degree because the lips and tongues are very sharp, shrink and warp badly but the quick type nailing of my obtuse tongue and groove makes a smoother tighter floor.

Fig. 4 shows saw cuts $c1$ and $c2$, which make fairly blunt angle tongues and grooves that may be best for most types of boards etc., while medium blunt angle $c4$ is best for my special designed siding.

Saw cut $c3$, would be best for ½ inch boards, plywood etc. for flooring.

A shaft with small saws mounted in front of upper saw units will cut angular overall, shallow surface grooves into interior boards, plywood, squares and panels, while tongues and grooves are being sawed.

The vertical cuts $c5$, Fig. 4, used for my special siding, is made by small saws put on the shaft in front of the upper shelf. These saws are set in an opposite direction to the saws cutting the tongues and grooves, thus a small part of the upper lip is cut off to produce a shallow groove in connection with the angling cut forming the tongue.

For overall grooving two saw units are set opposite to each other on the shelf in front of the upper shelf, or these grooves can be cut with special saw teeth designed for groove cutting saws, attached to a shaft in place of an extra shelf.

To run single precut boards thru to cut one edge into an obtuse tongue and the other into an obtuse groove, you set saw units 1 and 2 on lower and upper shelves the width of the board apart, to cut a second board at the same time you set saws 3 and 4, then 5 and 6 etc., and a four foot wide saw could keep two men busy putting in boards.

When two upper and two lower shelves are used to provide room for saw units with arbors longer than the width of the flooring etc. wanted, then saws 2, 4 and 6 etc. are removed from the front lower shelf to the back lower shelf and saws 1, 3 and 5 etc. of the upper shelf are moved to the back upper shelf to the same position.

I claim:

1. A table gang saw comprising a frame having four corner angle iron uprights extending above the usual working table attached to the corner uprights, four horizontal angle irons or bars connected firmly to the tops of the corner uprights and four horizontal angle irons fastened to the uprights a distance below the table, having two spaced upright bars or double bars near the center of the right side of the table extending from the lower horizontal angle iron to the upper one each fastened slidably to short horizontal slots in the horizontal angle irons, also two like upright bars on the left side fastened and positioned in a like manner, having above the table two spaced horizontal shelf bars each fastened firmly, but movably up or down to short slots in each of the upright bars, said slots being a practical distance above the table, having two like shelf bars positioned and fastened in a like manner below the table to the right and left side upright bars thus the two bar shelf above and the one below the table, each supporting saws, is adjustable vertically on the upright bars with the upper shelf bars being attached to the back side of the upright bars and the lower shelf bars being attached to the front of the upright bars thus interference between the upper and lower saws being prevented; two series of small fine toothed circular saws whose blades are alike in size thickness and speed to make smooth saw cuts of the same width, one series being placed and spaced on the shelf bars above the table and one placed and spaced on the shelf bars below the table and since the shelf bars are movable on the upright bars vertically the depth of the saw cuts is adjustable, each saw of the series having a saw bearing support plate, its center section being shaped to receive the lower half of the bearing which is parallel to and half way between its shelf bars, the saw blade and pulley being attached to the ends of the short arbor in the bearing whose upper half is covered by a shaped plate, the saw being at a right angle between the shelf bars, the width of the bearing support plate being adapted to the length of the arbor and its ends being supported one on one shelf bar and one on the other and adapted to fastening means that permit their sideway movement on the shelf bars and any desired pivotal angular position of the bearing support plate and its saws thereon in relation to the shelf bars.

2. A table gang saw comprising a frame of angle iron corner uprights, horizontal angle irons connected to their tops and horizontal angle irons attached to them below the working table, having on each side a pair of spaced upright bars or double bars connected to the upper and lower horizontal angle irons each upright bar having a short vertical slot at a distance above and below the table to which the two spaced horizontal bars above and below the table are attached in a firm but vertically movable manner, two series of small circular saw units each having a bearing support plate, a bearing and a short arbor with a pulley attached to one end and a saw blade to the other end at a right angle between the shelf bars on which the rounded ends of the bearing support plate rest and are fastened thereto in a firm but movable manner thereon, thus a desired number of saw units on the shelf bars can be spaced to cut a wide board or a sheet of plywood into a number of strips of desired width by adjusting the upper and lower shelf bars for the desired depth of the saw cuts, and the saw units being pivotably tiltable to any desired obtuse angle in relation to the board or sheet of plywood, the upper series of saws may be set to make obtuse angle cuts obliquely half way into the board and the lower series set to make obtuse angle cuts upwardly from below, sawing strips of flooring or siding each with one edge being a beveled obtuse angle tongue and one edge a corresponding groove.

3. A table gang saw comprising a frame of angle iron corner uprights, horizontal angle irons connected to their tops and horizontal angle irons attached to them below the working table, having on the left and the right side a pair of spaced upright bars or double bars connected to the upper and lower horizontal angle irons, each upright bar having a short vertical slot at a distance above and below the table to which two spaced horizontal bars above and below the table are attached firmly but vertically movable; a series of small circular saws above the table and below the table each saw a complete saw unit having a bearing support plate, a bearing and a short arbor therein with a pulley attached to one end and a saw blade to the other end and rotatable at a right angle between its shelf bars on which the rounded or octagonal ends of the bearing support plate rest fastened with suitable means firmly but movably to any desired spacing thereon and pivotably tiltable to any desired angular position of the saws to saw the upper obtuse angle cuts of any desired degree, including an obtuse angle tongue and groove whose upper cut or leg may be a near vertical or a vertical cut in grooving half inch boards or sheets of plywood for flooring but the upward cut from below retains its obtuse angle position and all the saws of the lower series being spaceable and pivotably tiltable as stated above.

References Cited in the file of this patent

UNITED STATES PATENTS

| | | | |
|---|---|---|---|
| Re. 14,660 | Dittmar | Apr. 5, | 1919 |
| 1,457 | Andrews et al. | Dec. 31, | 1839 |
| 160,939 | Miller | Mar. 16, | 1875 |
| 239,698 | Barthelmes | Apr. 5, | 1881 |
| 243,076 | McDonough | June 21, | 1881 |
| 386,035 | Riegel | July 10, | 1888 |
| 1,463,791 | Brekelmans | Aug. 7, | 1923 |
| 1,635,465 | De Penning | July 12, | 1927 |
| 1,644,710 | Crooks | Oct. 11, | 1927 |
| 1,947,395 | Hutchings | Feb. 13, | 1934 |
| 2,053,382 | Stickley | Sept. 8, | 1936 |
| 2,123,081 | Sadenwater | July 5, | 1938 |
| 2,198,245 | Goss et al. | Apr. 23, | 1940 |
| 2,455,097 | Scianna | Nov. 30, | 1948 |

FOREIGN PATENTS

| | | | |
|---|---|---|---|
| 7,603 | Switzerland | Nov. 23, | 1893 |
| 28,934 of 1913 | Great Britain | Dec. 15, | 1913 |